April 8, 1930.  F. E. SHARP  1,753,807
LEVELING DEVICE FOR TRACTORS
Filed May 8, 1928   2 Sheets-Sheet 1
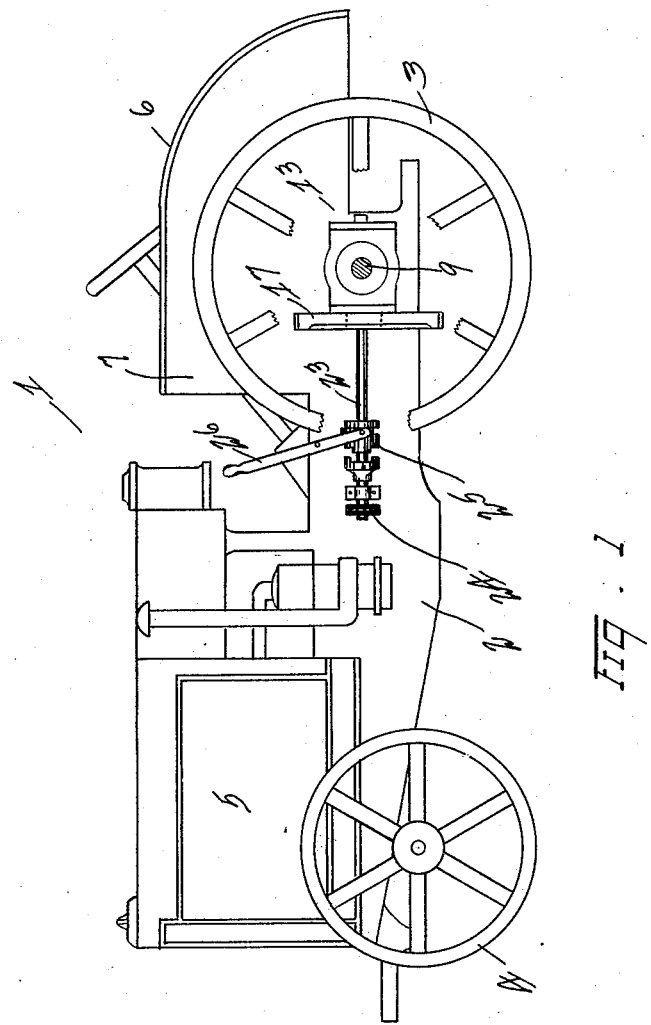
INVENTOR
BY *Frederick E. Sharp*
ATTORNEY April 8, 1930.  F. E. SHARP  1,753,807
LEVELING DEVICE FOR TRACTORS
Filed May 8, 1928  2 Sheets-Sheet 2
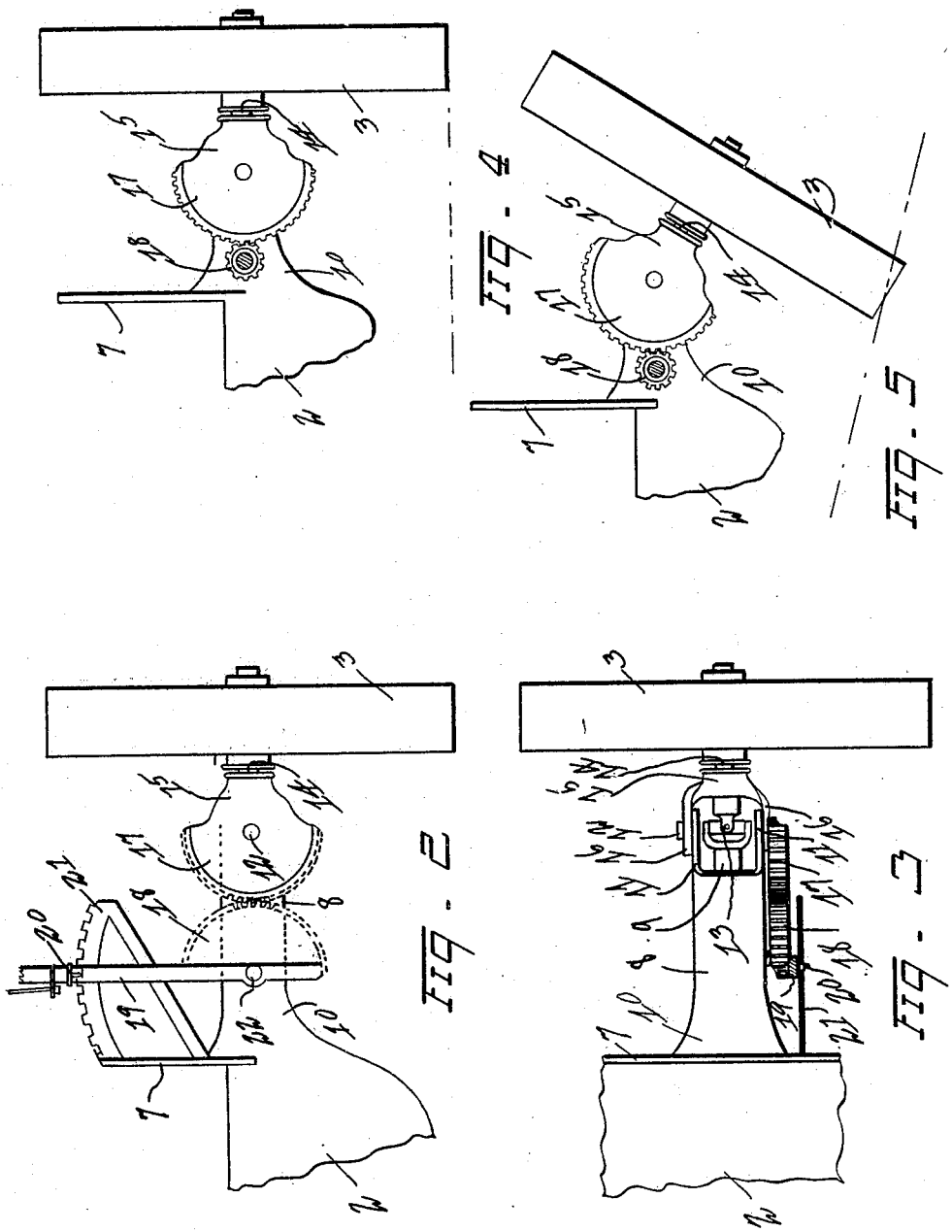
INVENTOR
BY *Frederick E. Sharp*
ATTORNEY Patented Apr. 8, 1930

1,753,807

UNITED STATES PATENT OFFICE

FREDERICK E. SHARP, OF PRESCOTT, WASHINGTON

LEVELING DEVICE FOR TRACTORS

Application filed May 8, 1928. Serial No. 276,041.

This invention relates to leveling devices for tractors, or other motor vehicles, and has as one of its objects to provide a leveling device that is applicable to tractor use for operation on level or hilly ground either by manual operation or by its own power.

Another object of the invention is to provide a leveling device that may be conveniently operated and substantially secured in the desired position.

With these and other objects in view reference is now to the accompanying drawings in which Fig. 1 is a side elevation of a tractor showing parts removed to disclose one means of operating the leveling device;

Fig. 2 is an enlarged front elevation of the device adapted for manual operation;

Fig. 3 s a plan view of the manually operated device;

Fig. 4 is an enlarged front elevation of the device adapted to be operated by power; and Fig. 5 is a similar view to Fig. 4, but showing the drive wheel in a lowered position for leveling.

Having reference to the drawings like numerals refer to like parts throughout the several views and the numeral 1 refers to a tractor which consists generally of a frame 2 mounted on drive wheels 3, one of which only is shown, and having its forward end supported by steering wheels 4 and mounting a power plant 5, and provided with fenders 6 positioned over the drive wheels and supported by a framework 7.

For the purpose of this invention the frame 2 is extended at a certain point, as shown in Figs. 2, 3, 4 and 5, to provide an extended bearing 8 for an axle 9 upon which the drive wheels 3 are mounted and by which they may be driven.

While the extended bearing 8 is shown integral with the frame, it is obvious that it may be applied as an attachment to the frame in the usual manner of such construction, not shown.

The extension is in continuation of a boss 10 providing strength and is also utilized to support the outer end of the axle as that member will be extended accordingly for the purpose of extension.

The boss and extension has provided on its outer end extending lips 11 which lips are adapted to provide oppositely positioned pivotal bearings 12, the centers of which lay in a horizontal plane and for a purpose to be explained.

The outer end of the axle is equipped with a universal joint 13, and a stub axle 14 is attached to the universal joint in continuation of the original axle, and this stub axle is adapted to carry the drive wheel which is mounted on the outer end of said stub axle to be driven by this assembly of parts.

As it is obviously necessary to support and brace the stub axle, a bracing means is provided which consists of a housing 15 having inwardly extending lips 16 corresponding to the first mentioned lips and adapted for pivotal engagement therewith for movement of the housing in a vertical plane.

Preferably integral with this housing and attached to one of the lips 16 and centered horizontally with said pivotal bearing 12, is a sector gear 17 which gear is adapted to be rotated to raise or lower the drive wheel on the pivotal points for the purpose of leveling the device.

To operate this gear, leveling gear 18, or pinion, is operably mounted on the boss 10 and the means of operation may be either manual or by power taken from the power plant 5 in the usual manner.

For manual operation the leveling gear 18 is pivoted to the extension member 8, or the boss 10, and is positioned to engage the sector gear 17, and the gear 18 is provided with an upwardly extending hand lever 19, as shown in Fig. 2 (in which the upper portion of the hand lever is broken away to keep within the confines of the drawing) by which the manual operation of the device is accomplished.

The hand lever 19 has a latching means 20 adapted to engage a quadrant 21 which quadrant is secured to the framework 7 of the fenders in any suitable manner.

By this means and arrangement of parts, a lateral movement of the hand lever 19 about its pivotal point 22 will cause a corresponding movement of the sector wheel 17 for leveling purposes as above mentioned.

Where it is desired to utilize power to perform the leveling operation, a pinion takes the place of the gear 18 and is rotatably mounted on the pivotal bearing 22 as before mentioned, and a forwardly extending shaft 23 carries a sprocket wheel 24, or other means, on its front end for driving this shaft from the power plant of the tractor.

By this means and with this shaft connected with the said pinion, the same movement of the sector gear will occur when power is applied, and for the purpose of controlling the power, a clutch mechanism 25 is mounted on said shaft, as shown, and is provided with an operating lever 26 whereby to engage or disengage the power with the sector gear.

Obviously, both power and manual operating means may operate conjointly, the power being used to assist the manual operation and the manually operated lever and its latch used to secure the drive wheel in the position desired.

In use the tractor is used in the usual manner and when upon a side hill, as represented by the broken and dotted line in Fig. 5, the drive wheel is dropped or lowered until the position of the tractor proper is on a level and lowering and raising of the wheel is accomplished as above explained.

By the extended boss, further extended by the stub axle, great latitude is obtained for leveling purposes.

Having thus described my invention, I claim—

In a leveling device for tractors, the combination with a tractor having an axle, and provided with drive wheels, a boss rigidly secured to and extended from said tractor, and disposed to provide a bearing for the outer end of said axle, said boss terminating at its outer end in extended lips providing horizontally disposed and oppositely positioned pivotal bearings, a housing provided with complemental lips pivotally mounted in the bearings of said extended lips, a universal joint rigidly secured to the end of said axle, and positioned on the pivotal line and within said lips, and provided with a stub axle adapted to carry the drive wheels, a gear sector rigidly secured to said housing for movement with that member, and centered at the pivotal point, and means rotatably carried by the boss to register said sector gear and to operate said gear to rotate said stub axle in a vertical plane.

In testimony whereof I affix my signature.

FREDERICK E. SHARP.